US005373424A

United States Patent [19]

Ishikawa

[11] Patent Number: 5,373,424

[45] Date of Patent: Dec. 13, 1994

[54] AUTOMOTIVE PROJECTION HEADLAMP

[75] Inventor: Masaaki Ishikawa, Shizuoka

[73] Assignee: Koito Manufacturing Co., Ltd., Tokyo, Japan

[21] Appl. No.: 126,654

[22] Filed: Sep. 27, 1993

[30] Foreign Application Priority Data

Oct. 21, 1992 [JP] Japan .................................. 4-282576
Nov. 10, 1992 [JP] Japan .................................. 4-77279

[51] Int. Cl.[5] .......................... B60Q 1/06; B60Q 1/16

[52] U.S. Cl. .................................. 362/61; 362/282; 362/283; 362/284; 362/319; 362/401

[58] Field of Search .................. 362/37, 61, 282, 283, 362/284, 319, 384, 401, 802

[56] References Cited

U.S. PATENT DOCUMENTS 4,336,571 6/1982 Marchand .......................... 362/384
4,875,141 10/1989 Miyauchi et al. .................. 362/284
5,060,120 10/1991 Kobayashi et al. .................. 362/61
5,068,768 11/1991 Kobayashi .......................... 362/61
5,138,540 8/1992 Kobayashi et al. .................. 362/61
5,158,352 10/1992 Ikegami et al. ...................... 362/61

*Primary Examiner*—Ira S. Lazarus
*Assistant Examiner*—Sara Sachie Raab
*Attorney, Agent, or Firm*—Sughrue, Mion, Zinn, Macpeak & Seas

[57] ABSTRACT

An automotive-type projection headlamp having a substantially elliptical reflector, a light source (bulb) located at the first focal point of the reflector, a projection lens disposed in front of the reflector, and a shade located at a position near the second focal point of the reflector for partially intercepting light passing from the reflector toward the projection lens. The shade is rotatable about a horizontal support shaft, and has a circumferential surface spirally shaped as seen in a longitudinal sectional view, so that the distance from the center of rotation of the shade to a point on the circumference thereof gradually varies. The vertex of the shade is vertically varied by turning the shade about the horizontal support shaft, thereby controlling the distribution of the output light beam. The horizontal support shaft is offset toward the projection lens from a point directly under the vertex of the shade, so that the vertex of the shade moves along a meridional image surface when the shade is turned. Balance weights may be fixed to the shade for making the center of gravity of the shade coincident with the center of rotation of the shade.

15 Claims, 8 Drawing Sheets

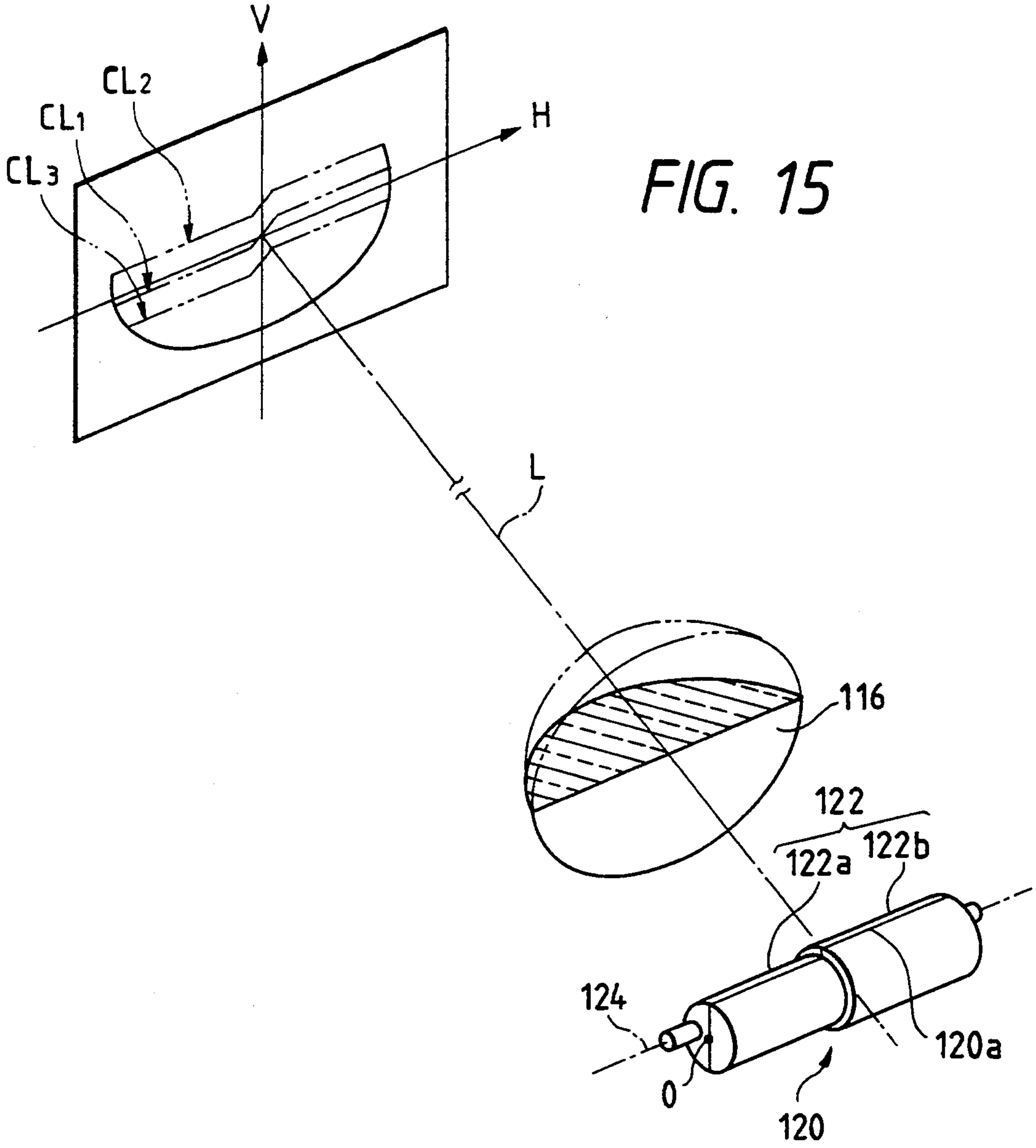
FIG. 15
FIG. 16
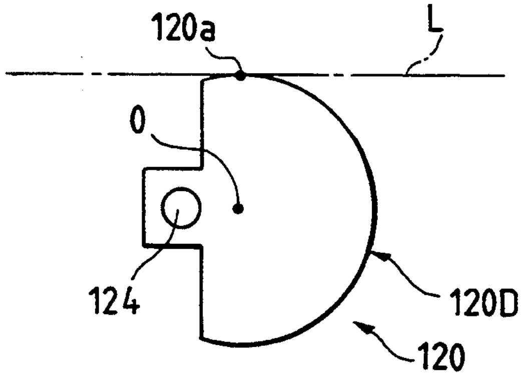

AUTOMOTIVE PROJECTION HEADLAMP

REFERENCE TO RELATED APPLICATIONS

Co-pending, co-assigned U.S. patent application Ser. No. 08/070,902 relates to similar subject matter.

BACKGROUND OF THE INVENTION

The present invention relates to a projection headlamp of the type in which a light beam reflected by a substantially elliptical reflector is projected in the forward direction of the vehicle by a projection lens. More particularly, the invention relates to an automotive-type projection headlamp capable of selectively changing a beam distribution pattern from one pattern to another by tilting a shade.

Conventional headlamps of this same general type are disclosed in Published Unexamined Japanese Utility Model Application No. Sho. 63-41801 and Published Unexamined Japanese Patent Application No. Hei. 1-213901.

The headlamp disclosed in Japanese Utility Model Application No. Sho. 63-41801 is constructed as shown in FIG. 1. As shown in FIG. 1, a light source 3 is positioned at the first focal point $F_1$ of a substantially elliptically shaped reflector 2, and a shade 4 is positioned at the second focal point $F_2$. A projection lens; 5 is located in front of the shade 4. In the headlamp thus constructed, for selectively changing a main beam distribution pattern, the shade 4 is turned about a horizontal support shaft 7 to partially intercept the light beam directed toward a projection lens 5. Reference numeral 1 designates a lamp body, and reference numeral 6 indicates a front lens.

The headlamp of the above-mentioned Published Unexamined Japanese Patent Application No. Hei. 1-213901 employs a shade turning arrangement different from that of Utility Model Application No. Sho. 63-41801, but the headlamps are both based on the same concept that, to select the main beam distribution pattern or the subbeam distribution pattern, the shade is turned.

The above-described conventional headlamps are capable of selecting between only two patterns—a main beam distribution pattern (high beam) and a subbeam distribution pattern (low beam). In other words, in such headlamps it is not possible to select a beam distribution pattern such as a medium beam distribution pattern of an intermediate state between the main beam and subbeam distribution patterns.

For highway driving, since the speed of the car is generally higher, the beam distribution pattern of the headlamp, when set at or close to the main beam distribution pattern, provides better visual recognition for the driver, but causes more intense glare to drivers of oncoming vehicles. It would therefore be very convenient if a medium beam distribution pattern could be used so as to not cause glare until the two vehicles come near each other within a certain distance.

As mentioned above, conventional headlamps could not select a beam distribution pattern other than the main beam distribution pattern and the subbeam distribution pattern. In this respect, the market has desired the development of a headlamp with which more than these two patterns can be selected.

To satisfy this market need, a headlamp has been proposed in commonly assigned Japanese Utility Model Laid-Open Publication No. Hei. 5-33402 in which, as shown in attached FIG. 2, a horizontal support shaft 7 is offset from the center axis O of a tubular body 4 acting as a shade. The tubular body 8 or the shade is turned about the horizontal support shaft 7. As the shade turns, the ridge of the shade 8 is vertically moved, whereby the cut line of the light beam distribution pattern is varied in a continuous manner. However, this approach still has problems, as will now be explained.

The horizontal support shaft 7, which defines the center of rotation of the shade, is not coincident with the center of gravity of the tubular body. In other words, the center of shade rotation is not coincident with the center of gravity of the tubular body. Accordingly, the load on the motor acting as the drive source varies in accordance with the position of the tubular body as it turns. This load variation hinders smooth rotation of the shade, viz., smooth variation of the distribution pattern.

Further, vibration caused by the car engine is unavoidably transmitted through the horizontal support shaft 7 to the tubular body 4. In this case, since the horizontal support shaft 7 supporting the tubular body is not coincident with the center of gravity thereof, some types of vibration can give rise to a high torque acting on the horizontal support shaft 7.

Moreover, vertical movement of the vertex of the shade causes displacement of the shade vertex in the direction of the optical axis. As a result, the shade vertex is displaced from the meridional image surface f. The resultant cut line is unclear. In the figure, $P_1$ indicates the vertex position of the shade (where the shade contributing to formation of the cut line in the distribution pattern is at the highest position) when the shade 8 is positioned as indicated by a solid line, $P_2$ indicates the vertex position of the shade (where the shade is turned a preset angle counterclockwise) when the shade 8 is positioned as indicated by a phantom line.

SUMMARY OF THE INVENTION

For the above reasons, the present invention has been made, and has as an object the provision of an automotive-type projection headlamp which can smoothly and continuously change the cut line in the vertical direction, while keeping the cut line clear.

To achieve the above and other objects of the invention, there is provided an automotive-type projection headlamp having a substantially elliptical reflector, a light source located at the first focal point of the reflector, a projection lens disposed in front of the reflector, and a shade located at a position near the second focal point of the reflector and the focal point of the projection lens, the shade partially intercepting a light beam reflected from the reflector toward the projection lens, and the shade being shaped such that the distance from the center of rotation of the shade to a point on the circumference of the shade gradually varies along the circumference. The shade is turned about the horizontal support shaft about a center of rotation offset from the center of gravity of the shade, wherein the vertex of the shade is vertically varied by turning the shade about the horizontal support shaft, thereby to control the distribution of the output light beam. In accordance with one aspect of the invention, the shade is provided with a balance weight for making the center of gravity of the shade coincident with the center of rotation of the shade.

When the shade is turned about the horizontal support shaft, the vertex of the shade is vertically varied, so that the distribution pattern (clear cut line) vertically varies. Due to the use of the balance weight, however, the center of gravity of the shade or shades is made coincident with the center of rotation the shade or shades. This remarkably reduces loads such as a torsion torque acting on the horizontal support shaft.

Further to achieve the above and other objects of the invention, there is provided an automotive projection headlamp which has a substantially elliptical reflector, a light source located at the first focal point of the reflector, a projection lens disposed in front of the reflector, and a shade located at a position near the second focal point of the reflector for partially intercepting light beams reflected from the reflector toward the projection lens. The shade is rotatable about a horizontal shaft, and has a circumferential surface spirally shaped as viewed in a longitudinal sectional view. The distance from the center of rotation of the shade to a point on the circumference gradually varies. The vertex of the shade is vertically varied by turning the shade about the horizontal support shaft, thereby controlling the distribution of the output light beam. In accordance with another aspect of the invention, the horizontal support shaft is offset toward the projection lens from directly under the vertex of the shade, so that the vertex of the shade moves along the meridional image surface when the shade is turned.

That is, in the above projection headlamp, at least the vertex region of the shade for forming the clear cut line is defined by a tubular surface, and the horizontal support shaft is offset from the axis of the tubular surface.

The inventive projection headlamp is capable of turning forwardly and reversing the shade about a horizontal support shaft. Therefore, the clear cut line can be vertically moved in a continuous manner by gradually changing the height of the shade (vertex of the shade) intercepting the light beam between the reflector and the projection lens. Further, since the center of rotation of the shade is offset toward the projection lens from a position directly under the vertex of the shade, the vertex of the shade moves along the meridional image surface as the shade turns, thereby keeping the cut line clear.

Since the shade is formed of a cylindrical surface, the shade can easily be manufactured.

BRIEF DESCRIPTION OF THE DRAWINGS

FIG. 15 is a perspective view showing a beam distribution pattern formed by the shade and headlamp of FIG. 10 as seen by the driver; and FIG. 16 is a cross-sectional view showing a key portion of a shade according to fourth embodiment of the present invention.

DESCRIPTION OF THE PREFERRED EMBODIMENTS

Preferred embodiments of the present invention now will be described with reference to the accompanying drawings.

Figure 1:
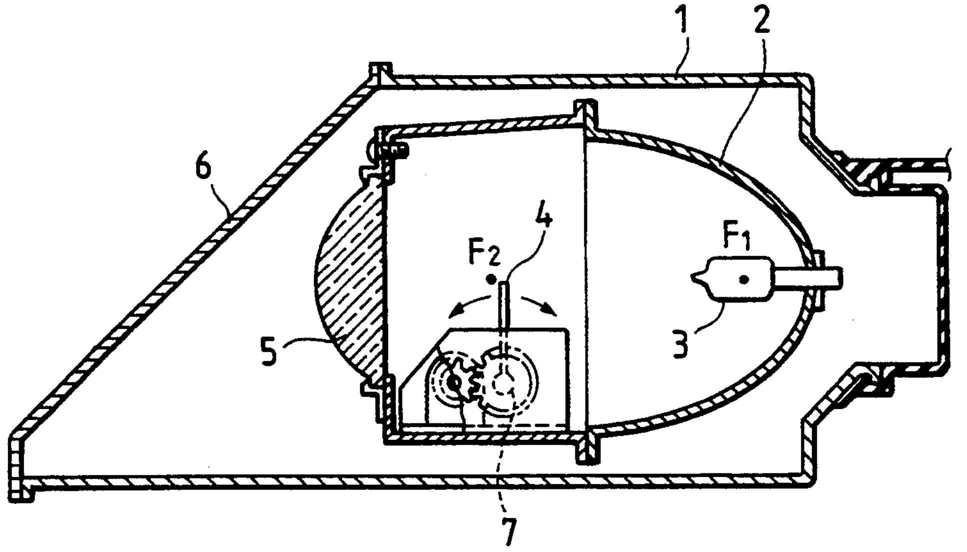
FIG. 1 PRIOR ART
FIG. 1 is a longitudinal sectional view showing a conventional headlamp.
Figure 2:
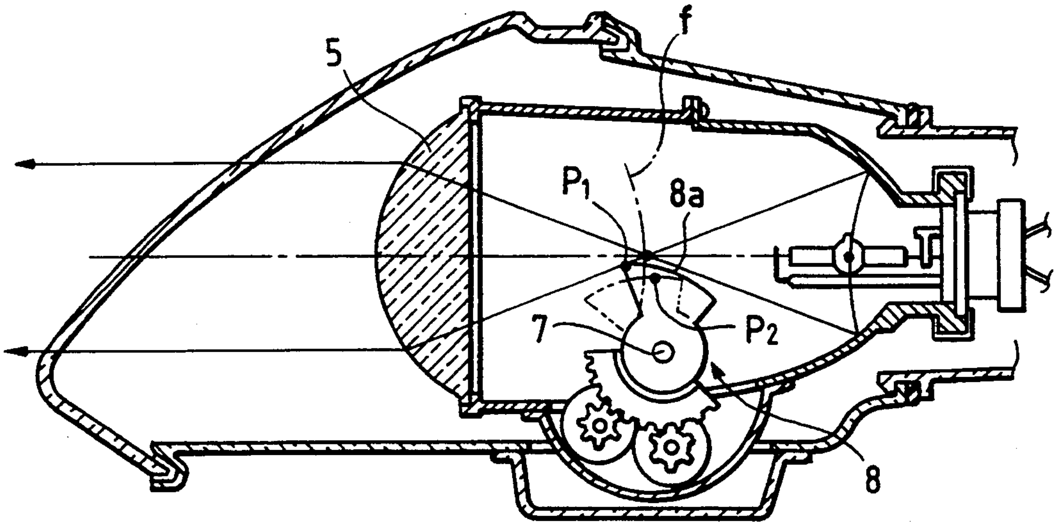
FIG. 2 PRIOR ART
FIG. 2 is a longitudinal sectional view showing another conventional headlamp.
Figure 3:
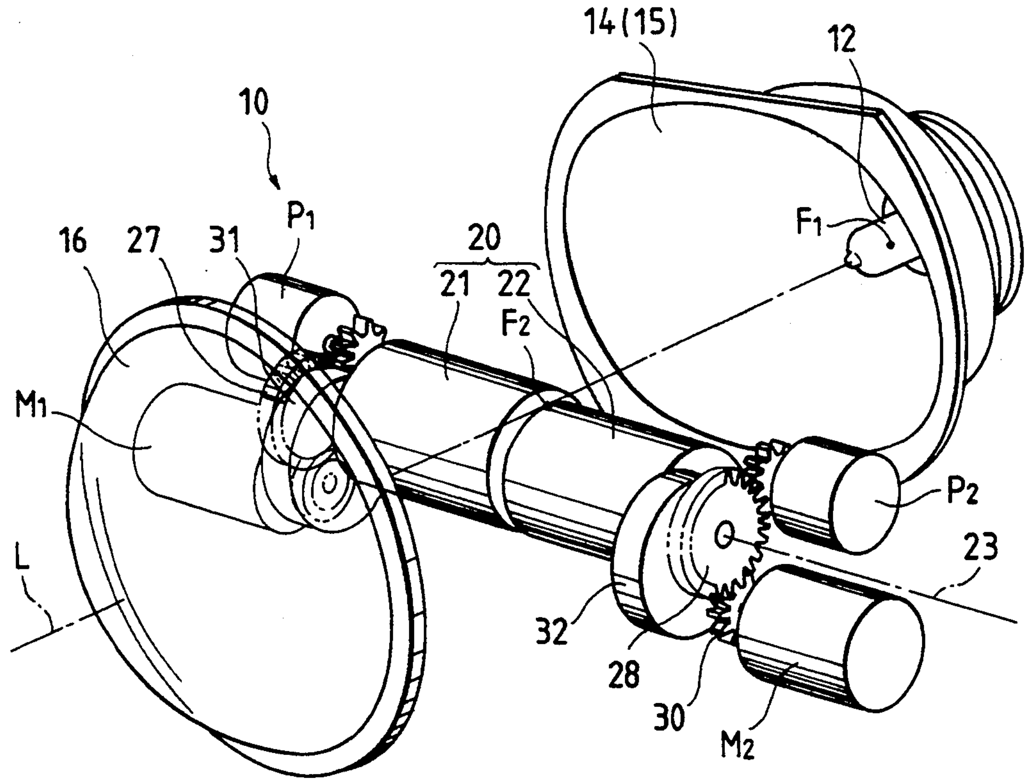
FIG. 3 is a perspective view showing the internal structure of an automotive projection headlamp constructed according to a preferred embodiment of the present invention.
Figure 4:
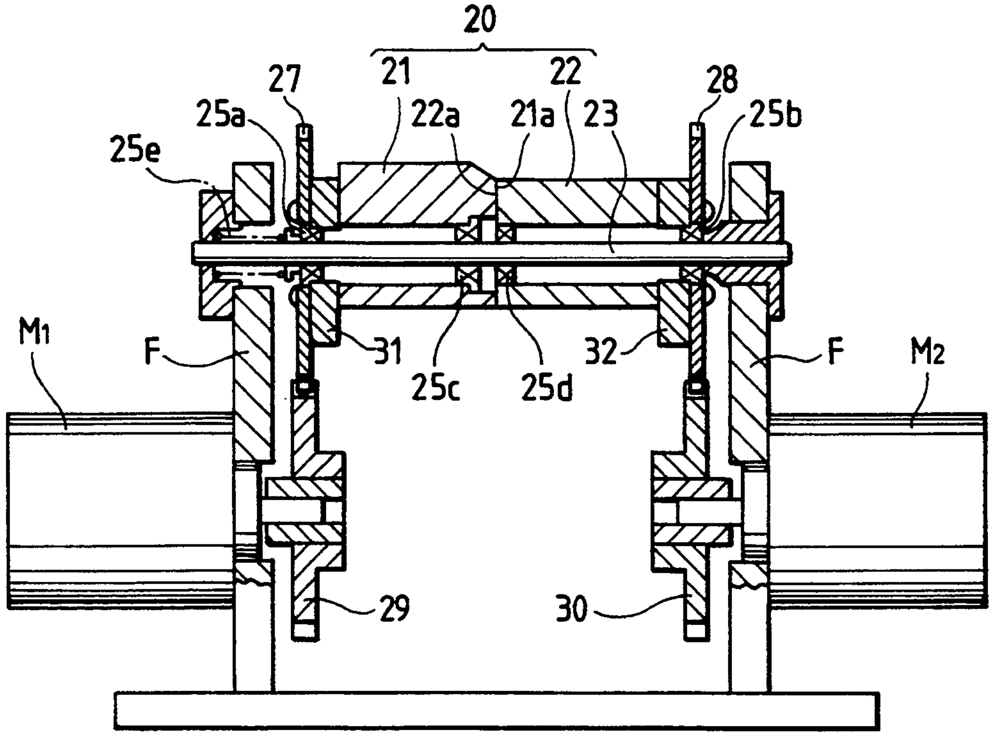
FIG. 4 is a longitudinal sectional view showing the shade used in the projection headlamp of FIG. 1.
Figure 5:
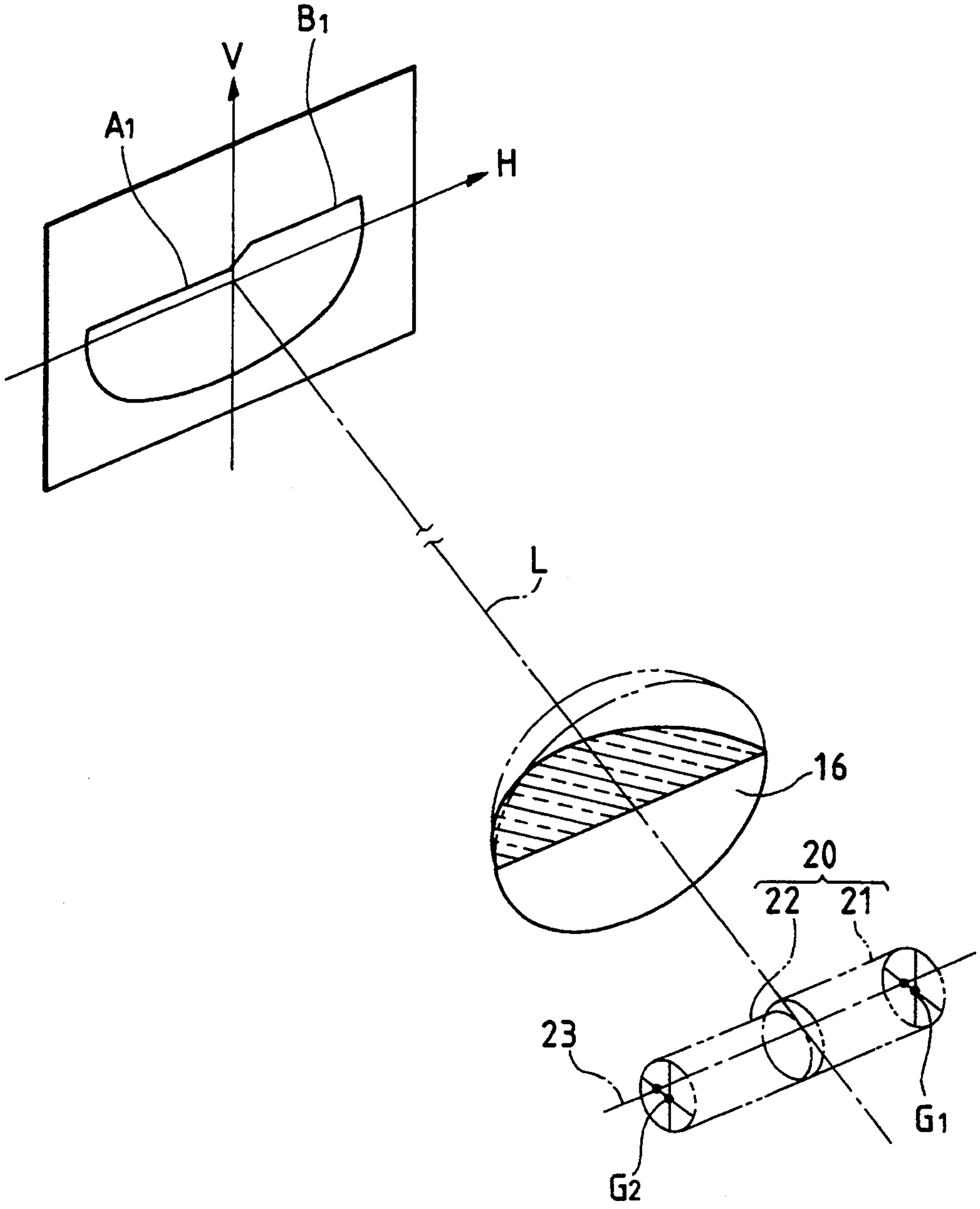
FIG. 5 is a perspective view showing a beam distribution pattern formed by the shade and the headlamp as seen by the driver.
Figure 6:
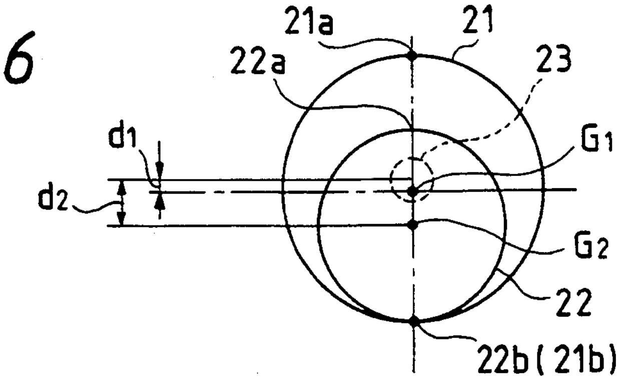
FIG. 6 is a diagram used in explaining the shape of the shade used in the headlamp.
Figure 7:
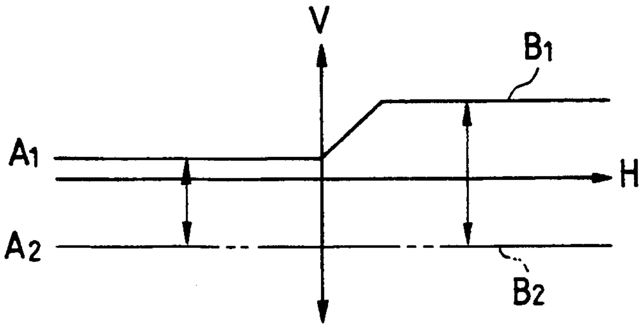
FIG. 7 is an explanatory diagram showing a change of the clear cut lines of a distribution pattern formed by the projection headlamp.
Figure 8:
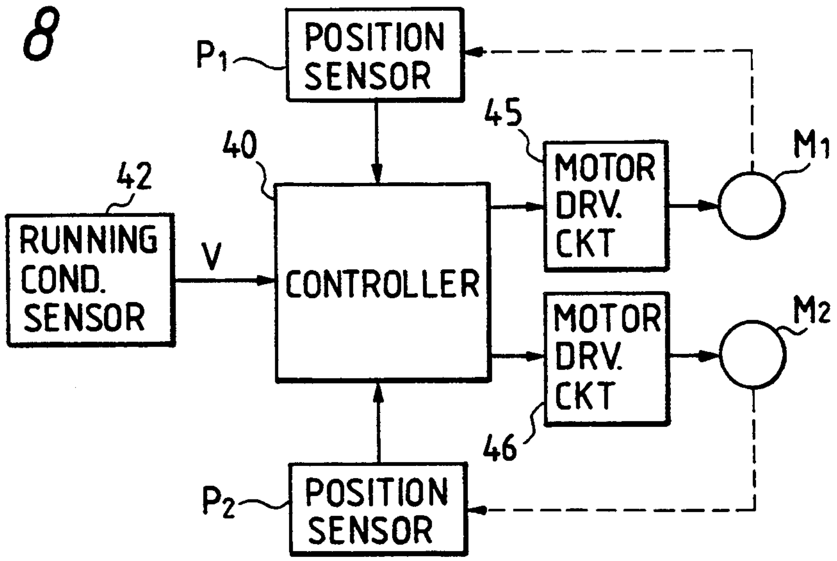
FIG. 8 is a block diagram showing a control system for controlling drive quantities of motors.

In FIGS. 3 to 7 show an automotive projection headlamp constructed according to a first preferred embodiment of the present invention, the headlamp being designed according to European and U.S. specifications so as to form a right-side beam distribution pattern. FIG. 3 is a perspective view showing the internal structure of a projection headlamp according to the first embodiment of the invention, FIG. 4 is a longitudinal sectional view showing the shade used in the projection headlamp of FIG. 3, FIG. 5 is a perspective view showing a beam distribution pattern formed by the shade and the headlamp as seen by the driver, FIG. 6 is a diagram used in explaining the shape of the shade used in the headlamp, FIG. 7 is an explanatory pattern formed by the projection headlamp, and FIG. 8 is a block diagram showing a control system for controlling drive quantities of motors.

In these figures, a projection unit 10, supported by an aiming mechanism (not shown), is mounted in a lamp body (also not shown). The projection unit 10 is tiltable about a horizontal shaft and a vertical shaft (not shown) by the aiming mechanism. The aiming direction of the light beam projected from the projection unit 10, viz., the optical axis L of the headlamp, can be tilted back and forth as well as to the left and right by the aiming mechanism.

The projection unit 10 includes a substantially elliptical reflector 14 inserted into a discharge bulb 12 and a projection lens 16 located in front of the reflector 14, the reflector 14 and the projection lens 16 being firmly coupled together to form essentially a one-piece construction. The projection lens 16 is supported by a lens holder (not shown) fastened to the reflector 14 by means of screws. An elliptical reflecting surface 15 having first and second focal points $F_1$ and $F_2$ is formed on the inner side of the reflector 14.

The filament of a bulb 12 is located at the first focal point $F_1$ of the reflector. A shade 20 is located at the focal position of the projection lens 16, near the second focal point $F_2$ of the reflector 14. The shade 20 shades part of the light beams which are reflected by the reflector 14 and pass to the projection lens 16, thereby forming a clear cut line for the subbeam.

The light from the discharge bulb 12 is reflected by the reflecting surface 15, guided forward, and arranged into substantially parallel light beams by the projection lens 16.

As illustrated in FIG. 3 and 4, the shade 20 includes a left shade 21 and a right shade 22. The right and left shades are separated and horizontally extended when seen from a point substantially directly under the optical axis L. The shades 21 and 22, which are made of tubular members of different diameters, are rotatably supported by a horizontal support shaft 23.

The horizontal support shaft 23 serving as the center of rotation of the shades 21 and 22 is eccentric with respect to the centers of gravity $G_1$ and $G_2$ of the shades 21 and 22, which act as tubular rotating members. In other words, the shades 21 and 22 are eccentric with respect to the horizontal support shaft 23. When the shades 21 and 22 are turned, the clear cut lines vertically move within the ranges between $A_1$ and $A_2$, and $B_1$ and $B_2$ indicated in FIG. 7. Eccentric quantities of the shades are denoted as $d_1$ and $d_2$, as indicated in FIG. 6.

Reference numerals 25*a* to 25*d* designate ball bearings. The shades 21 and 22 are rotatably supported by the horizontal support shaft 23 of which both ends are secured to a frame F. A compressed coil spring 25*e* pushes the shade 21 toward the shade 22.

To secure smooth rotation of the shades 21 and 22, at least the sliding faces 21*a* and 22*a* of the shades 21 and 22 are made of ceramic, which provides a smaller sliding friction than metal.

Gears 27 and 28 are fastened to the shades 21 and 22. These gears are respectively in mesh with drive gears 29 and 30, which are fixed to the output shafts of motors $M_1$ and $M_2$. The shades 21 and 22 are independently turned by the motors $M_1$ and $M_2$. With the independent turning of the shades, the heights and the contours of the clear cut lines on the distribution screen can be variously adjusted between the lines $A_1$ and $A_2$, and $B_1$ and $B_2$ (FIG. 7), with respect to the vertical axis V.

Reference numerals 31 and 32 designate balance weights integral with the shades 21 and 22. With the use of the balance weights, the centers of gravity $G_1$ and $G_2$ of the shades 21 and 22 are made to coincide with their centers of rotation, thereby reducing the loads imposed on the motors $M_1$ and $M_2$, which are the shade drive sources, hence providing smooth rotation of the shades 21 and 22.

If the balance weights are not used, the loads on the motors $M_1$ and $M_2$ vary with the angular positions of the shades 21 and 22. As a result, the inertial loads on the motors while turning the shades 21 and 22 vary depending on the angular or circumferential positions of the shades 21 and 22, causing a time lag between the start of turning the shades and the start of changing the distribution pattern.

In the above embodiment of the present invention, due to the use of the balance weights, one part of each shade closer to the projection lens is balanced against the other part thereof closer to the reflector with respect to the horizontal support shaft 23. The shade 21 (22) is balanced about the horizontal support shaft 23 as its center of rotation. The loads (inertia loads) on the motors $M_1$ and $M_2$ are thus kept substantially constant. Moreover, the time required to turn the shades, which is made constant irrespective of the angular positions of the shades, is reduced.

The above-described shade 20 for forming the right-side beam distribution patterns is designed according to European or U.S. specifications. In a mode shown in FIG. 6, where a point 21*a* of the shade 21 is at the highest position (the lowest position of the ridge of the left shade 21), the clear cut line formed by the left shade 21 is set at a position $A_1$. When the left shade 21 is gradually turned from this position, the clear cut line gradually declines. In another mode where a point 21*b* of the shade 21 is at the highest position (the highest position of the ridge of the left shade 21), the clear cut line is set at a position $A_2$. The clear cut line formed by the right shade 22 is set at a position $B_1$ in a mode shown in FIG. 6 where a point 22*a* of the shade 22 is at the highest position (the lowest position of the ridge of the right shade 22). In another mode where a point 22*b* of the shade is the highest position (the lowest position of the ridge of the right shade 22), the clear cut line is set at a position $B_2$.

FIG. 8 is a block diagram showing a shade drive control system. A controller 40 for controlling the drive quantities of the motors $M_1$ and $M_2$ receives data of the angular positions of the shades from position sensors $P_1$ and $P_2$ for detecting the angular positions of the shades 21 and 22. The controller 40 previously stores in the form of data table rotation angle data $\theta_1$ and $\theta_2$ of the shades 21 and 22 for forming various distribution patterns under various running conditions, such as normal drive (high) beams, low beams, left-turn beams, and right-turn beams. The controller 40 receives a running-condition signal V from a sensor 42, which, for example, senses the direction and amount of turning of the steering wheel and whether a high or low beam has been selected by the driver. Upon receipt of the signal V, the controller 40 selects a data signal corresponding to the received signal V and outputs it to motor drive circuits 45 and 46. In turn, the motors $M_1$ and $M_2$ are driven to turn the shades 21 and 22 by preset quantities, thereby to form the distribution pattern best matched to the current running conditions.

Figure 9:
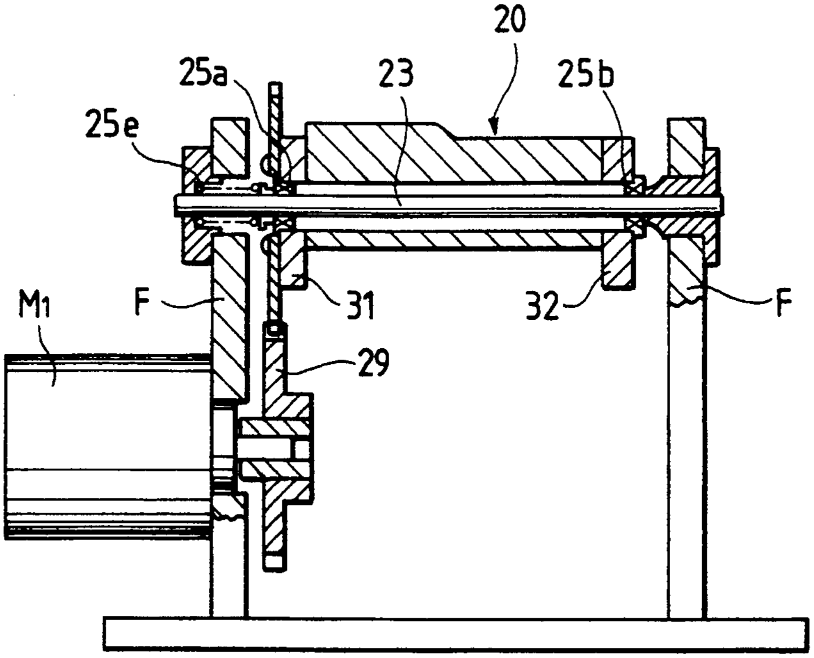
FIG. 9 is a longitudinal sectional view showing a shade rotation mechanism, which forms a key portion of a projection headlamp of a second embodiment of the invention.

FIG. 9 is a longitudinal sectional view showing a shade rotation mechanism as a key portion of a projection headlamp according to a second embodiment of the present invention. In the first embodiment as described above, the right and left shades 22 and 21 are rotatable independent of each other. In the second embodiment, a single shade 20 is used instead of the two separate shades. A single drive motor $M_1$ drives the single shade 20 forwardly and reversely about the horizontal support shaft 23 for vertically moving the clear cut lines of the distribution pattern. The remaining construction of the second embodiment is substantially the same as that of the first embodiment. Hence, no further detailed explanation will be provided.

As seen from the foregoing description, in the projection headlamp of the present invention, the height of the ridge of the shade or shades varies when the shade is turned about the horizontal support shaft. Accordingly, the distribution pattern (clear cut line) vertically varies to provide a continuous change of the distribution pattern.

Due to the use of the balance weights, the center of gravity of the shade or shades is made coincident with the center of rotation of the shade or shades. This remarkably reduces the loads, such as torsion torque, acting on the horizontal support shaft, which functions as the shade support shaft.

Figure 10:
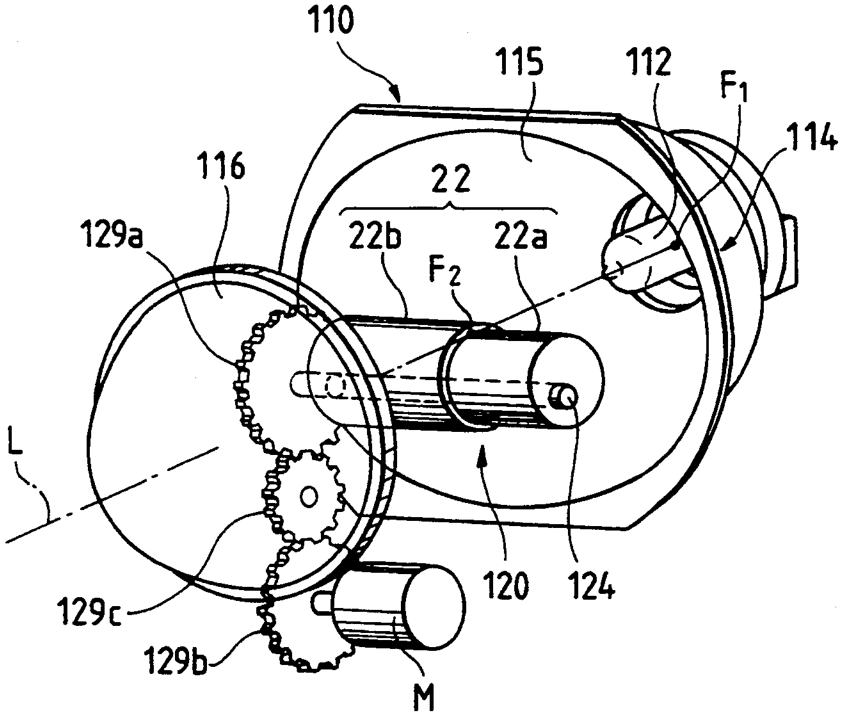
FIG. 10 is a perspective view showing the internal structure of an automotive projection headlamp according to a third embodiment of the present invention.
Figure 11:
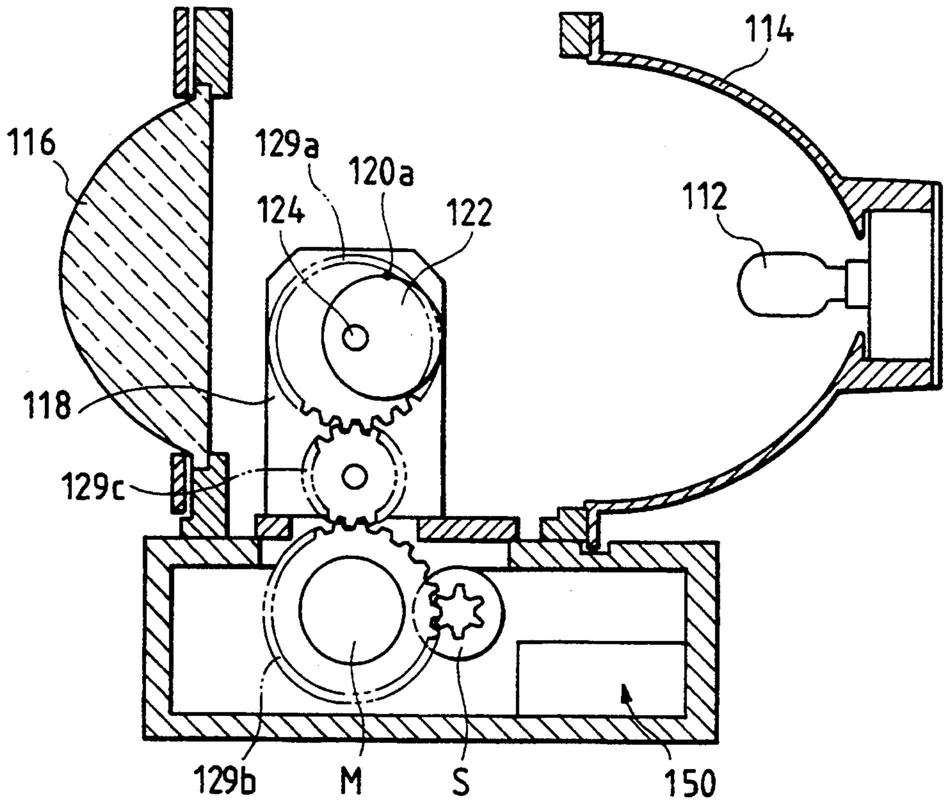
FIG. 11 is a longitudinal sectional view showing the internal structure of the projection head lamp of FIG. 10.
Figure 12:
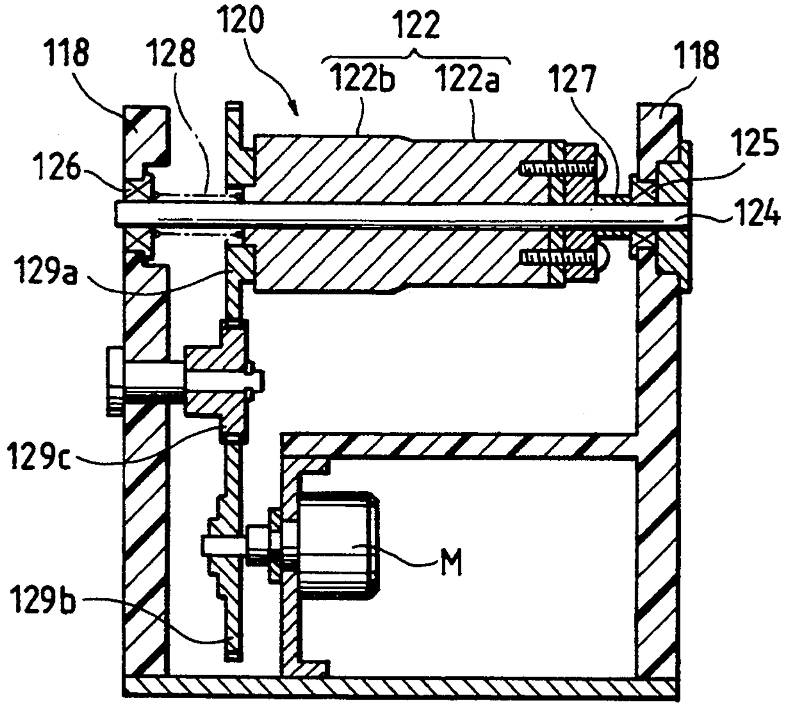
FIG. 12 is a longitudinal sectional view showing the shade used in the projection headlamp of FIG. 10.
Figure 13:
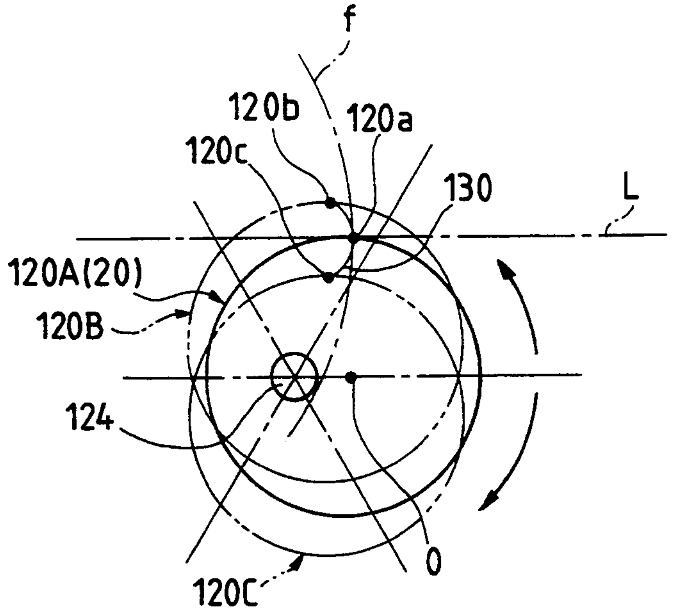
FIG. 13 is a diagram used in explaining displacement of the vertex of the shade used in the headlamp of FIG. 10.
Figure 14:
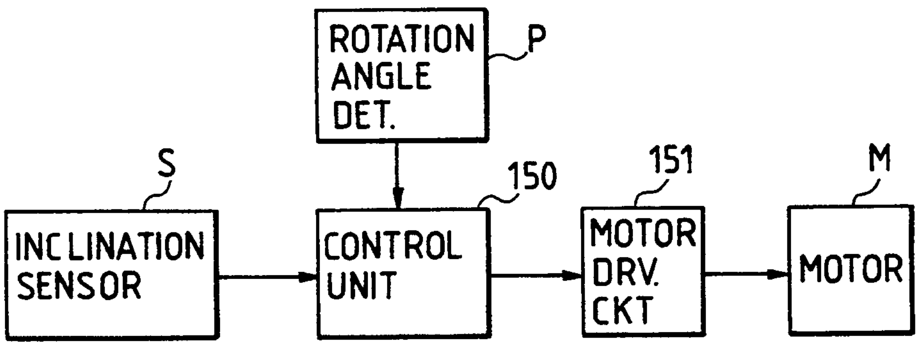
FIG. 14 is a block diagram showing a control system for controlling the turning of the shade.

FIGS. 10 to 15 show an automotive projection headlamp according to a third embodiment of the present invention, the headlamp being designed according to European and U.S. specifications so as to form the right-side beam distribution pattern. FIG. 10 is a perspective view showing the internal structure of the projection headlamp according to the third embodiment of the present invention. FIG. 11 is a longitudinal sectional view showing the internal structure of the projection headlamp of FIG. 10. FIG. 12 is a longitudinal sectional view showing the shade used in the projection headlamp of FIG. 10 when seen from the lens side. FIG. 15 is a perspective view showing a beam distribution pattern formed by the shade and the headlamp as seen by the driver. FIG. 13 is a diagram used in explaining the displacement of the vertex of the shade used in the headlamp. FIG. 14 is a block diagram showing a control system for controlling the turning of the shade.

In these figures, a projection unit 110, supported by an aiming mechanism (not shown), is mounted in a lamp body (also not shown). The projection unit 110 is tiltable about a horizontal shaft and a vertical shaft (not shown) by the aiming mechanism. The aiming direction of the light beams projected from the projection unit 110, viz., the projection axis (optical axis) L of the headlamp, can be tilted back and forth as well as to the left and right by the aiming mechanism.

The projection unit 110 includes a substantially elliptical reflector 114 together with a discharge bulb 112 and a projection lens 116 located in front of the reflector 114, the reflector 114 and the projection lens 116 being firmly coupled together in essentially a one-piece construction. The projection lens 116 is supported by a lens holder (not shown) fixed to the reflector 114 by means of screws. An elliptical reflecting surface 115 having first and second focal points $F_1$ and $F_2$ is formed on the inner side of the reflector 114. The filament of a bulb 112 is Located at the first focal point $F_1$. A shade 120 is located at the focal position of the projection lens 116, near the second focal point. $F_2$ of the reflector. The shade 120 shades part of the light beams which are reflected by the reflector 114 and pass to the projection lens 116, thereby forming a clear cut line. The light emitted from the discharge bulb 112 is reflected by the reflecting surface 115 and guided forward, and arranged into substantially parallel light beams by the projection lens 116.

As illustrated in FIGS. 10, 11 and 12, the shade 120 is constructed with a stepped tubular member 122 inclusive of a large diameter section **122*a* and a small diameter section 122*b*, both sections having a common axis. A horizontal support shaft 124 is horizontally extends from both ends of the stepped tubular member 122 orthogonal to the optical axis L. The horizontal support shaft 124, which is integral with the stepped tubular member 122, is rotatably supported at both ends by bearings 125 and 126, which are mounted on a frame 118 secured to a lens holder (not shown). Reference numeral 127 designates a collar member 127 for separating the shade 120 from the bearing 125. Reference numeral 128 represents a compressed coiled spring 28 for pressing the shade 120 against the collar member 127. A gear 129*a* is secured to the shade 120. The gear 129*a* is in mesh with a follower gear 129*c*, which is in mesh with a drive gear 129*b* secured to the output shaft of the drive motor M. The drive motor M forwardly or reversely turns the shade 120** to vertically move the clear cut line in the distribution pattern.

The horizontal support shaft 124 is offset from the axis of the stepped tubular member 122 when the vertex **120*a* of the shade 120 (120A) is coincident with the focal position of the projection lens 116 (see the continuous line in FIG. 14). In this case, the horizontal support shaft 124 is offset from the axis O toward the projection lens 116 by a distance equal to approximately one-half the radius of the stepped tubular member 122. Accordingly, while the shade 120** is forwardly and reversely turned, the clear cut line vertically moves in the range of $CL_1 \rightarrow CL_2 \rightarrow CL_3$.

In FIG. 13, reference numerals 120B and 120C are representative of the positions of the shade 120A when it is turned by 60° forwardly and reversely. Reference numerals **120*b* and 120*c* indicate the vertex positions of the shade 120A when it is turned. A phantom line 130 indicates the locus of the vertex 120*a* of the shade when it is turned. As seen from FIG. 13; the locus 130 of the shade vertex 120*a* when the shade 120A is turned forwardly and rearwardly has substantially an arcuate shape along the image plane f of the projection lens 116. Thus, when the shade 120A is turned, the vertex 120*a* of the shade vertically moves, but it remains in the vicinity of the image plane f. Therefore, the clear cut lines $CL_2$ and $CL_3$ vertically moving in the distribution pattern remain clear. Reference numeral P indicates a rotation angle detector such as a rotary encoder or a position meter. The output signal of the rotation angle detector p is fed back to the control unit 150**.

FIG. 14 is a block diagram showing a motor drive control system for controlling the turning of the shade when the headlamp shown in FIGS. 10 and 15 is used for leveling adjustment of the distribution pattern. In the figure, reference symbol S indicates an inclination sensor for detecting an inclination angle of the vehicle body about a lateral axis. The output signal of the inclination sensor S is input to a control unit 150. The control unit 150 outputs to a motor drive circuit 151 a control signal so as to vertically move the clear cut lines in accordance with the inclination of the car body about a lateral axis.

If, for example, heavy packages are loaded on the trunk, passengers are sitting on the rear seat, or the car is being accelerated, the body of the car tends to be inclined in a state such that the forward end of the car body is higher than the rear end (squat mode). In the squat mode, the clear cut line moves up above the horizontal line H in the distribution screen, so that the output light beam has a tendency to cause glare to oncoming vehicles. If the vehicle is abruptly braked, the car body is inclined in a state that the rear end thereof is higher than the forward end (nosedive mode). In the nosedive mode, the clear cut line moves below the horizontal line H, so that the driver can see the areas to the front of the vehicle only under poor illumination by the headlamps. In this case, the inclination sensor senses the inclination of the vehicle body and sends an inclination signal to the control unit 150. Then, the control unit 150 drives the motor drive circuit 151 to move up or down the clear cut line so as to keep the clear cut line always at the horizontal line as seen by the driver.

FIG. 16 is a cross-sectional view showing a key portion of a shade according to a fourth embodiment of the present invention. In this embodiment, the shade 120 is constructed such that substantially half 120D of the tubular body has a horizontal support shaft 124 integral therewith at a location offset from the axis O of the tubular body, and is turned about the horizontal support shaft 120. Thus, in the shade of the fourth embodiment, only the vertex region of the shade for forming clear cut lines is defined by a tubular surface, and this region can be turned about the horizontal support shaft offset from the axis of the tubular member. Regions of the shade other than the clear cut forming region may take any shape.

As seen from the foregoing description, the automotive projection headlamp of the invention is capable of turning the shade forwardly and reversely about a horizontal support shaft. Therefore, the clear cut line can be vertically moved in a continuous manner by gradually changing the height of the shade (vertex of the shade) intercepting the light beam between the reflector and the projection lens. Further, the center of rotation of the shade is offset relative to the projection lens from a point directly under the vertex of the shade. Therefore, the vertex of the shade moves along the meridional image surface when the shade turns, thereby keeping the cut line clear.

It is further to be noted that, since the shade is formed of a cylindrical surface, the shade can easily be manufactured.

What is claimed is:

1. An automotive projection headlamp, comprising:

a substantially elliptical reflector having first and second focal points, said first focal point being closer to said reflector than said second focal point;

a light source located at said first focal point of said reflector;

a projection lens disposed in front of said reflector on an optical axis of said reflector at a position further from said reflector than said second focal point;

a shade located at a position near said second focal point of said reflector and a focal point of said projection lens, said shade partially intercepting light passing from reflector toward said projection lens;

a horizontal support shaft mounting said shade for rotation about an axis of rotation offset from a center of gravity of said shade, wherein a vertex of said shade is vertically varied by turning said shade about said horizontal support shaft, thereby controlling a distribution of an output light beam from said headlamp, said shade being shaded such that a distance from said axis of rotation to an outer boundary of said shade varies along said axis of rotation; and balance weights fixed to said shade for making said center of gravity of said shade coincident with said center of rotation of said shade.

2. The projection headlamp of claim 1, wherein said shade comprises first and second tubular members of different diameters eccentrically mounted on said horizontal support shaft.

3. The projection headlamp of claim 2, wherein said balance weights comprise first and second weights mounted outwardly of said first and second tubular members, respectively, on said horizontal support shaft.

4. The projection headlamp of claim 2, wherein said first and second tubular members are independently rotatable.

5. The projection headlamp of claim 4, further comprising first and second drive means for independently rotating said first and second tubular members.

6. The projection headlamp of claim 2, wherein said first and second tubular members rotate together.

7. The projection headlamp of claim 6, further comprising a single drive means for rotating both said first and second tubular members.

8. The projection headlamp according to claim 1, further comprising means for rotating said shade in accordance with at least one of a steering angle and an inclination angle of a motor vehicle.

9. An automotive projection headlamp, comprising:

a substantially elliptical reflector having first and second focal points, said first focal point being closer to said reflector than said second focal point;

a light source located at said first focal point of said reflector;

a projection lens disposed in front of said reflector on an optical axis of said reflector at a position further from said reflector than said second focal point;

a rotatable horizontal shaft;

a shade located at a position near said second focal point of said reflector between said reflector and said projection lens for partially intercepting a light beam between said reflector and said projection lens, said shade being mounted on said horizontal shaft to be rotatable about said horizontal shaft, said shade having a circumferential surface shaped such that a distance from a center of rotation of said shade to a point on the circumference of said shade gradually varies, wherein a vertex of said shade is vertically varied by turning said shade about said horizontal support shaft, thereby controlling a distribution of an output light beam from said headlamp, said horizontal support shaft being offset toward said projection lens from a point directly under said vertex of said shade, said vertex of said shade moving along an image plane when said shade is turned about said horizontal support shaft.

10. The projection headlamp according to claim 9, wherein at least a vertex region of said shade is defined by a tubular surface.

11. The projection headlamp according to claim 10, wherein said horizontal support shaft is offset from a longitudinal axis of said tubular surface.

12. The projection headlamp according to claim 10, wherein said shade comprises a tubular stepped member having a large diameter portion and a small diameter portion, each of said large diameter portion and said small diameter portion being eccentrically mounted on said horizontal support shaft.

13. The projection headlamp according to claim 10, wherein said horizontal support shaft is offset toward said projection lens from said point directly under said vertex of said shade by an amount approximately equal to half a radius of said tubular stepped member.

14. The projection headlamp according to claim 9, wherein only a vertex region of said shade is defined by a tubular surface, other portions of said shade having a different shape.

15. The projection headlamp according to claim 9, further comprising means for rotating said shade in accordance with at least one of a steering angle and an angle of inclination of a motor vehicle.

* * * * *